Oct. 8, 1935.   A. JOSEPOWITZ   2,016,926
APPARATUS FOR EMPTYING AND CLEANING BEER AND OTHER PIPES
Filed June 26, 1934   2 Sheets-Sheet 1
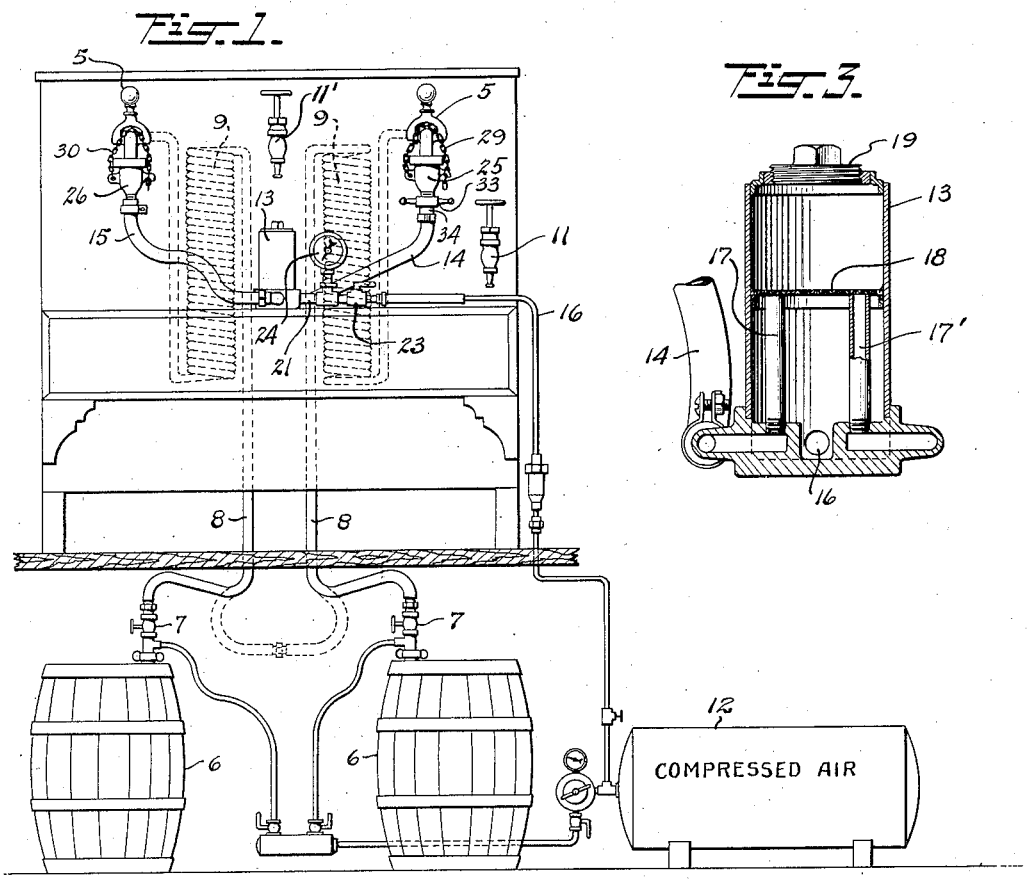
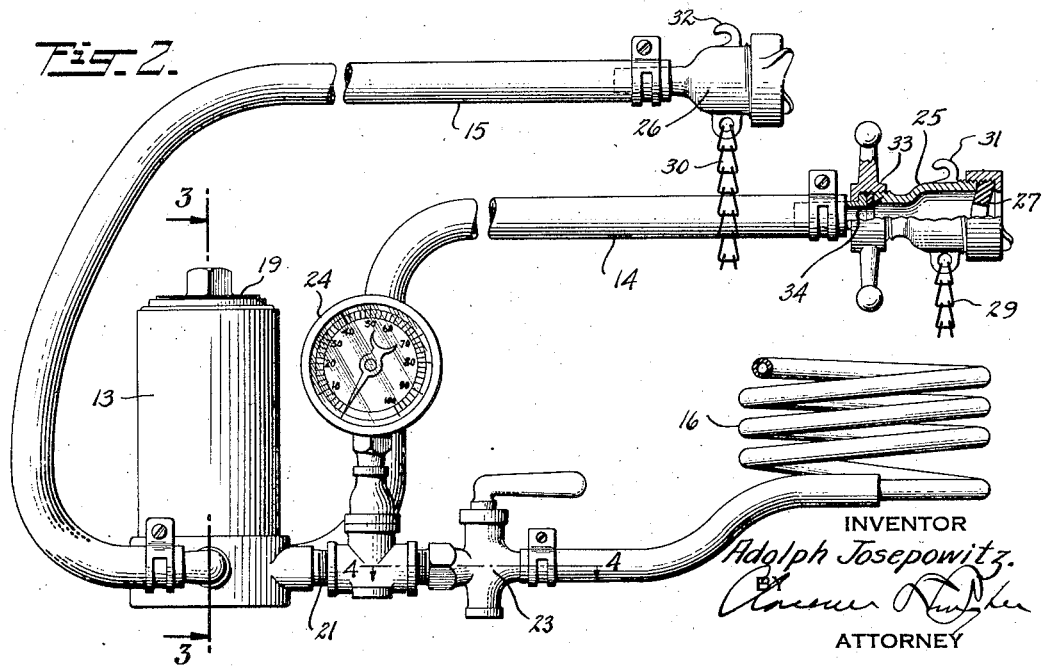
INVENTOR
Adolph Josepowitz
BY
ATTORNEY Oct. 8, 1935.  A. JOSEPOWITZ  2,016,926
APPARATUS FOR EMPTYING AND CLEANING BEER AND OTHER PIPES
Filed June 26, 1934   2 Sheets-Sheet 2
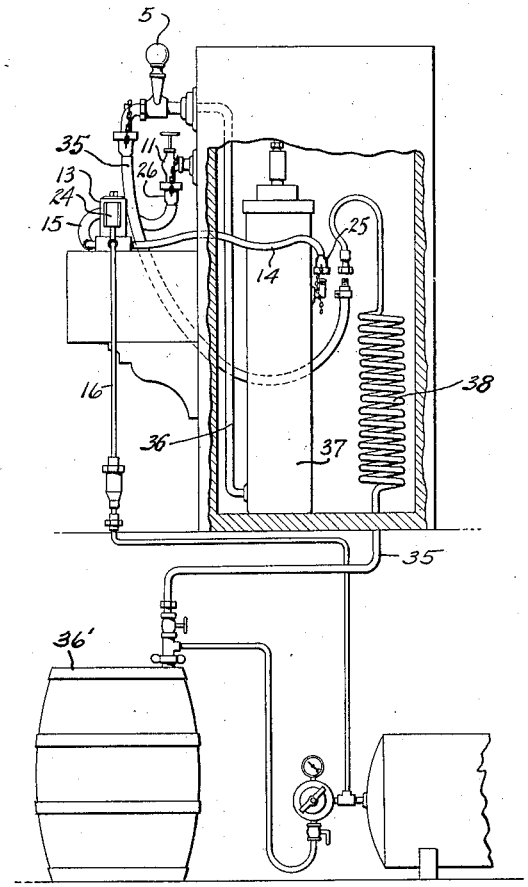
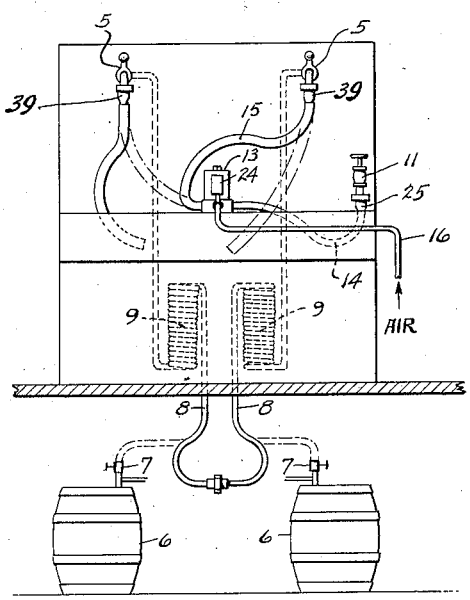
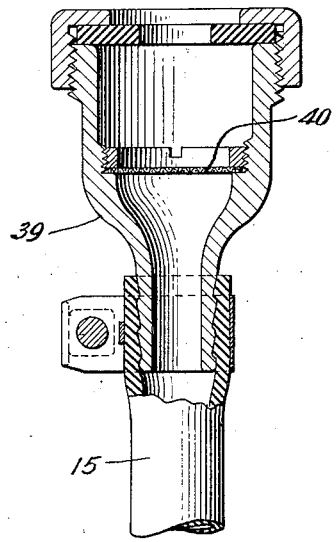
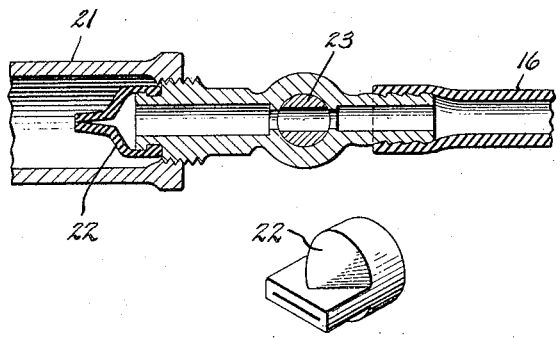
INVENTOR
Adolph Josepowitz.
BY
ATTORNEY Patented Oct. 8, 1935

2,016,926

UNITED STATES PATENT OFFICE 2,016,926

APPARATUS FOR EMPTYING AND CLEANING BEER AND OTHER PIPES

Adolph Josepowitz, New York, N. Y., assignor to Joss Equipment and Service Corporation, New York, N. Y., a corporation of New York Application June 26, 1934, Serial No. 732,423

3 Claims. (Cl. 225—12)

My invention relates to methods of and apparatus for cleaning pipes, and other liquid containers and connections.

It is particularly applicable to the pipes, tanks, containers, and connections between the beer kegs and drawing faucets of beer dispensing apparatus, which are usually cleaned at the present time by discharging through the pipes and connections a cleaning fluid, such as water containing a cleaning material, and sometimes also air under pressure.

Before cleaning such pipes and connections, it has been necessary heretofore to draw off a considerable amount of beer in the pipes, which was thus wasted. Furthermore, after the dispensing apparatus has been out of use over night or during holidays, it has been necessary when dispensing was resumed, first to draw off all the beer in the pipes, etc., down to the supply kegs, because the beer becomes stale and otherwise deteriorates when it has been left standing in the pipes for a considerable period of time. All this beer was thus wasted causing considerable loss every day.

My invention comprises first a simple, convenient and effective method of and apparatus for forcing and restraining the beer in the pipes and connections back into the supply kegs and thus saving all the beer, before cleaning the pipes and also before closing the bar for the night or holidays.

My invention also comprises a simple, convenient and effective method of and apparatus for cleaning the pipes and connections.

My invention also comprises various novel features of construction and combinations of parts hereinafter fully described and particularly pointed out in the claims.

In order that my invention may be fully understood, I shall first describe in detail the method and apparatus by which I at present prefer to carry this into effect and then point out the various features of the invention in the claims. I shall describe the invention particularly as applied to the pipes and connections of beer dispensing apparatus, but it must be understood that the invention is equally applicable to pipes, containers and other connections used for storing or dispensing other liquids.

Reference is to be had to accompanying drawings forming part of this application in which like parts are designated by the same numbers in all the figures.

Figure 1 shows pipe emptying and cleaning apparatus in accord with my invention applied to one form of beer service bar.

Figure 2 shows the said apparatus enlarged and detached from the bar.

Figure 3 is a sectional elevation of the receptacle for the cleaning material, and connections.

Figure 4 is a longitudinal sectional view of part of the compressed air pipe.

Figure 5 is an enlarged view of the check valve in said air pipe.

Figure 6 shows the said apparatus applied to another form of beer service bar.

Figure 7 is an enlarged sectional view of a modified form of hose coupling.

Figure 8 shows a modified form and use of the apparatus.

Referring first to Figures 1, 2, 3, 4 and 8, number 6 designates the beer kegs or retainers; 7 the keg closure valves; 8 the pipes leading from the kegs 6 to the beer faucets 5; 9 the cooling coils included in the pipes between the kegs and service faucets 5; 11 a hot, 11' a cold water faucet, 12 the compressed air reservoir or supply of an ordinary form of beer service bar.

The specific embodiment of my improved apparatus here shown, comprises an air tight cylindrical metal receptacle 13, to which are tightly connected at the bottom and which thus serves as a union for, a hose length 14, an oppositely entering hose length 15, and a compressed air pipe 16. On the entering metallic ends of the hose lengths 14 and 15 in the receptacle 13, are screwed detachable, vertical pipe lengths 17 and 17' shown in Figure 3, on the upper ends of which is supported a screen 18 below the top of the receptacle 13, and in the top of the receptacle 13 is screwed an air tight removable metal closure 19. The screen 18 is adapted to support a cleaning material, such as salt for example, in granular form.

In the metal section 21 of the air pipe 16, entering the receptacle 13 is arranged a check valve 22 shown in Figures 4 and 5, opening toward the receptacle, and an air cock 23, and on the pipe section 21 is fixed an air pressure gauge 24, to indicate the pressure in the air pipe 16.

On the outer ends of the hose lengths 14 and 15, are fixed air tight faucet couplings 25 and 26, with contained rubber washers 27, to fit tightly over the faucets, and chains 29 and 30 and hooks 31 and 32, to lock the couplings and hose lengths to the faucets, as shown in Figures 1 and 2.

The faucet coupling 25, as shown in Figure 2, is provided with a handled female section 33, screwing upon the male section 34, so that by partly unscrewing said screw sections, the coupling can be opened slightly to release gradually the compressed air before uncoupling from the faucets.

In using this apparatus according to my method for emptying the pipes before cleaning or before closing the bar, the two hose couplings 25 and 26 are coupled, as best illustrated in Figure 1, to two adjacent beer faucets 5, the chains 29, 30 being passed around the faucets and engaged with the hooks 31, 32, to prevent the couplings from becoming detached from the faucets.

The cock 23 in the compressed air pipe 16 is then opened, the faucets 5 opened, and the compressed air admitted through the faucets 5 into the beer pipes 8 at a pressure higher than the pressure in the pipes. The beer in the pipes will then be forced back into the beer kegs 6. As the compressed air is admitted into the pipes 8, the index of the pressure gauge 24 will slowly retreat owing to the expansion of the entering air until all the beer is forced back into the kegs 6, when the index will be arrested. The beer can then be restrained in the kegs by closing the keg closure valve 7 or by closing the faucets 5 and thus locking the compressed air in the pipes to overcome the pressure of the beer in the kegs.

The bar can then be closed for the night or holidays, without the beer deteriorating in the pipes and cooling coils.

On the next opening of the bar, the beer can be drawn and all used immediately without throwing away and wasting the beer in the pipes and coils as is the usual custom where my improved method of emptying pipes is not used.

When the pipes and coils are emptied by the method above described, preliminary to cleaning the pipes, coils and parts connected therewith, the beer is restrained in the kegs 6 by their closure valves 7, and the beer pipes 8 then disconnected from the kegs and coupled together at their lower ends as indicated in dotted lines in Figures 1 and 3.

One of the hose couplings 25, detached from the corresponding beer faucet 5, is then coupled preferably to the hot water faucet 11, as shown in Figure 8, and the other coupling 26 connected to the other beer faucet, both beer faucets being opened, and the solid cleaning material, which may be salt in the granular form, placed on the screen 18 in the receptacle 13, which is tightly closed.

The water, preferably hot, is then turned on at the faucet 11, and rushes through the receptacle 13, dissolving in itself the cleaning material, and then through the coupled pipes 8 and coils 9, or it may be a single pipe and coil, cleaning the pipes and coils of the slime, etc., deposited thereon, which is discharged through the open beer faucet 5, into the waste.

To complete the cleaning process the water is then shut off at the faucet 11, or it may continue to flow, and the compressed air cock 23 in the air pipe 16 is then opened. The compressed air will then be discharged through the union or receptacle 13, and the coupled pipes 8 and coils 9, with or after the water, blowing out any remaining deposit or foreign matter remaining in the pipes and coils, which are thereby most thoroughly cleaned. The hose lengths 14 and 15 are then uncoupled from the faucets and coupled to the next faucets for emptying and beer saving, or emptying and cleaning as described.

In Figure 6, I have shown my apparatus applied to an ordinary tank system service bar. In this illustration of my invention, the hose length 14 is connected by the coupling 25 to the upper part of the combination air pressure and beer tank 37, the hose length 15 coupled to the hot water faucet 11, the beer pipe 36 connected to the lower part of the tank 37, and the beer pipe 35 coupled to the beer faucet 5.

To empty the tank 37, coil 38 and pipe 35, of beer, before cleaning or closing, the compressed air from the pipe 16 is admitted through the hose length 14 into the tank 37 and beer pipes 36 and 35 until all the beer therein is forced back into the keg 36', where it is restrained for cleaning or closing, as before explained.

To clean the tank 37, pipes and coils, the cleaning liquid is first discharged through the hose length 14, tank 37, beer pipe 36, beer pipe 35, and coil 38, and then followed up with the compressed air through the air pipe 16, also as before described.

In Figures 7 and 8, I have shown modified forms of faucet couplings 39, in which a screen 40 is fixed across the coupling, to retain a soluble cleaning compound, with or without the cleaning compound in the receptacle 13 or with or without said receptacle 13, which may be merely a union or connection of the hose lengths 14 and 15 with the air pipe 16. Either faucet 39, being coupled to the water faucet as described, the water will rush through the cleaning compound on the faucet screen 40, pick up the same and carry it through the system as before described.

In some instances, I may use with or without the liquid cleaning compound, an elastic ball of rubber, or metallic, mineral or other hard fibres, which is placed in one of the couplings 39, above the screen 40, so that when the compressed air is turned on through the pipe 16, the cleaning ball will be driven through the entire system of pipes and coils until it reaches the screen 40 in the other coupling 39, effectually removing all deposits or accumulations, hardened or otherwise, in the pipes and coils.

The hose length 15 may then be reversed on the beer faucets 5, as indicated in Figure 8, and the cleaning ball driven back by the compressed air in the reverse direction through the system as before. This process may be repeated as often as necessary effectually to clean the system.

In the same manner, the motion of the cleaning liquid and the compressed air through the system may be reversed at will.

When the air pressure, as is usual, is too high to be admitted directly into the beer pipes and kegs, for driving the beer back into the kegs, the faucets 5 are not opened until the receptacle 13 and hose lengths 14 and 15, acting as a reservoir, are filled with the compressed air at its maximum pressure. The air cock 23 is then closed, and the faucets 5 opened to admit the air from the reservoir thus formed into the pipes until the pressure gauge 24 shows that the air pressure is equalized, and the beer driven back into the kegs, when the keg valves 7 are closed to restrain the beer in the kegs as before described.

It is evident that the compressed air used in my method and apparatus may be supplied by a reservoir, power pump, hand pump or from any other source. The check valve 22, shown in Figures 4 and 5 admits the air but prevents the entry of water into the air pipe 16.

This compact apparatus here shown may be conveniently stored in or attached to any form of bar, stationary or portable.

It is evident that the specific character of the method and apparatus shown and described herein as one practice and embodiment of my invention, may be greatly varied in detail without departing from the boundaries of my invention.

In using the term "pipes" in the following claims, I mean to include coils, tanks, and all other liquid containers, to which my method and apparatus in any form is applicable or adaptable.

I claim as my invention:

1. Apparatus for emptying pipes of and saving liquids between the container and the faucets and cleaning the pipes, comprising a receptacle having a removable closure to receive a soluble cleaning material, two hose lengths leading into the receptacle, means for coupling the outer ends of the two hose lengths, to two liquid faucets or to a liquid faucet and a water faucet, a compressed air supply and pipe leading into the receptacle, means for preventing the liquid and water from entering the air pipe while permitting the air to enter the receptacle, means for restraining the undissolved portion of the soluble cleaning material in the receptacle while permitting the water to pass through the cleaning material, the hose lengths, and the liquid pipes, and means for permitting the compressed air to pass through the receptacle, the hose lengths and the liquid pipes.

2. Emptying and cleaning apparatus as specified in claim 1, in which the means for restraining the undissolved portion of the cleaning material in the receptacle while permitting the water to pass through the cleaning material and the pipes is a screen dividing the receptacle into upper and lower compartments, the upper compartment holding the cleaning material and both hose lengths and the air pipe leading into the lower compartment.

3. Emptying and cleaning apparatus as specified in claim 1, in which the means for restraining the cleaning material in the receptacle while permitting the water to pass through the cleaning material, the hose lengths and the pipes are a screen dividing the receptacle into upper and lower compartments, the upper compartment holding the cleaning material, and both hose lengths, and the air pipe leading into the lower compartment, and a stand pipe in the lower compartment leading from one hose length upward to the screen.

ADOLPH JOSEPOWITZ.